(12) United States Patent  (10) Patent No.: US 7,878,428 B2
Pinon et al.  (45) Date of Patent: Feb. 1, 2011

(54) DEVICE AND METHOD FOR LOADING A CHAMBER WITH A DIVIDED SOLID

(75) Inventors: Ulysse Pinon, Le Havre (FR); Nicolas Dromard, Le Havre (FR); Bernard Cottard, Saint Romain De Colbosc (FR)

(73) Assignee: Total Raffinage Marketing, Puteaux (FR)

( * ) Notice: Subject to any disclaimer, the term of this patent is extended or adjusted under 35 U.S.C. 154(b) by 854 days.

(21) Appl. No.: 11/631,190

(22) PCT Filed: Jun. 15, 2005

(86) PCT No.: PCT/FR2005/001486

§ 371 (c)(1),
(2), (4) Date: Jul. 30, 2007

(87) PCT Pub. No.: WO2006/013240

PCT Pub. Date: Feb. 9, 2006

(65) Prior Publication Data

US 2007/0297880 A1 Dec. 27, 2007

(30) Foreign Application Priority Data

Jul. 2, 2004 (FR) .................................. 04 07355

(51) Int. Cl.
*A10C 17/00* (2006.01)
*B65G 68/32* (2006.01)
(52) U.S. Cl. ...................... 239/684; 414/170
(58) Field of Classification Search ........... 414/170, 414/193, 203, 204; 141/286; 239/684
See application file for complete search history.

(56) References Cited

U.S. PATENT DOCUMENTS

| 2,773,610 | A | * | 12/1956 | Mohr, Jr. et al. | 414/161 |
| 3,285,438 | A | * | 11/1966 | Clyde et al. | 414/299 |
| 3,490,619 | A |   | 1/1970  | Dewittie |  |
| 3,780,890 | A | * | 12/1973 | Glover | 414/170 |
| 4,300,725 | A |   | 11/1981 | Moherek |  |
| 4,397,423 | A | * | 8/1983  | Beaver et al. | 239/684 |

FOREIGN PATENT DOCUMENTS

| EP | 0 116 246 A1 | 8/1984 |
| JP | 58-6844 A | 4/1983 |
| WO | WO 02/08099 A | 1/2002 |

\* cited by examiner

*Primary Examiner*—Charles A Fox
(74) *Attorney, Agent, or Firm*—Sughrue Mion, PLLC

(57) ABSTRACT

The invention relates to a device for filling a chamber with a divided solid comprising a divided solid feeder hopper (1), an exhaust chimney (2) fixed to said hopper or connected thereto by a supply conduit (3), a motor unit (4) rotatably driving a shaft (5) which is substantially disposed in the direction of the exhaust chimney and at least one deflector member (8) which is mounted downstream of the output orifice(s) (6, 7) of the exhaust chimney and is pivotable about sail shaft (5) in such a way that it angularly moves away therefrom due to a centrifugal force when said shaft (5) rotates. The shaft (5) is embodied in such a way that it is hollow and shaped in the form of a tube whose internal diameter is sufficient for passing a functional device (9) therethrough.

16 Claims, 4 Drawing Sheets

Figure 1:
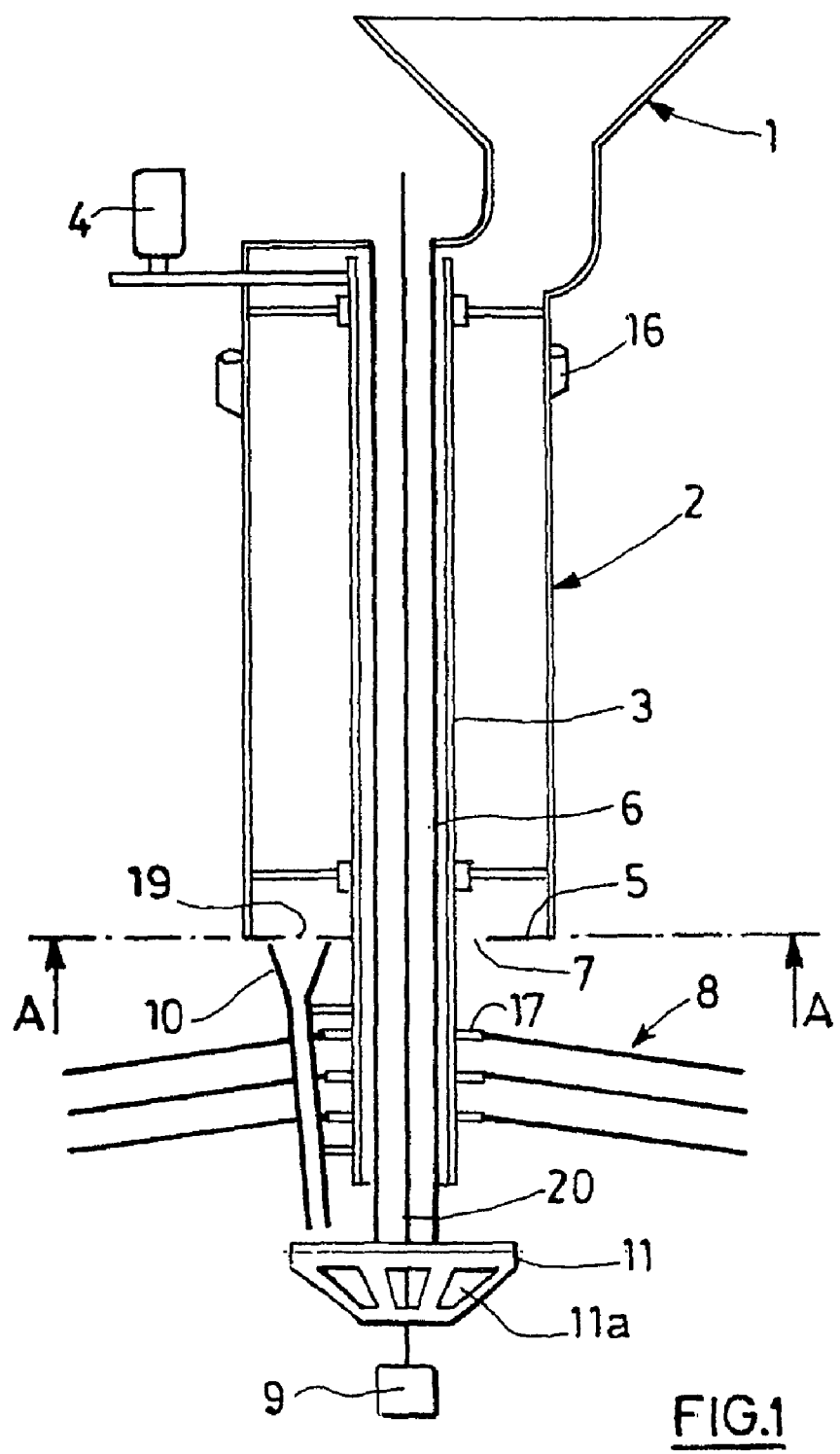

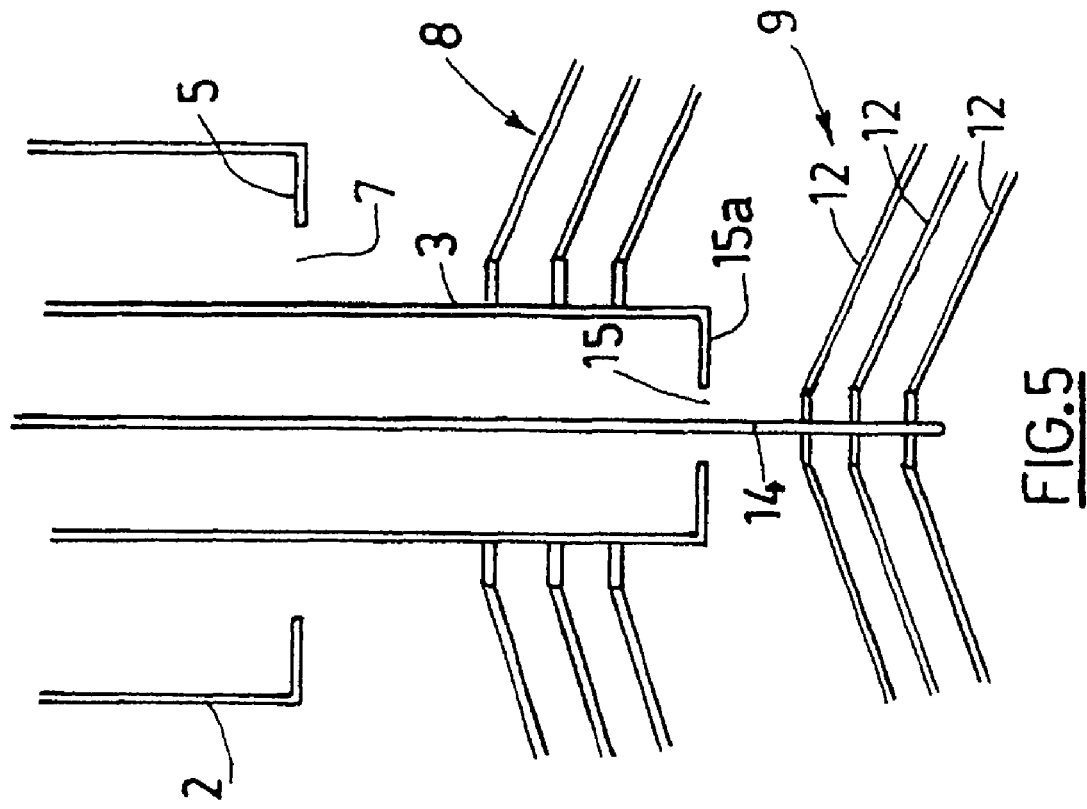
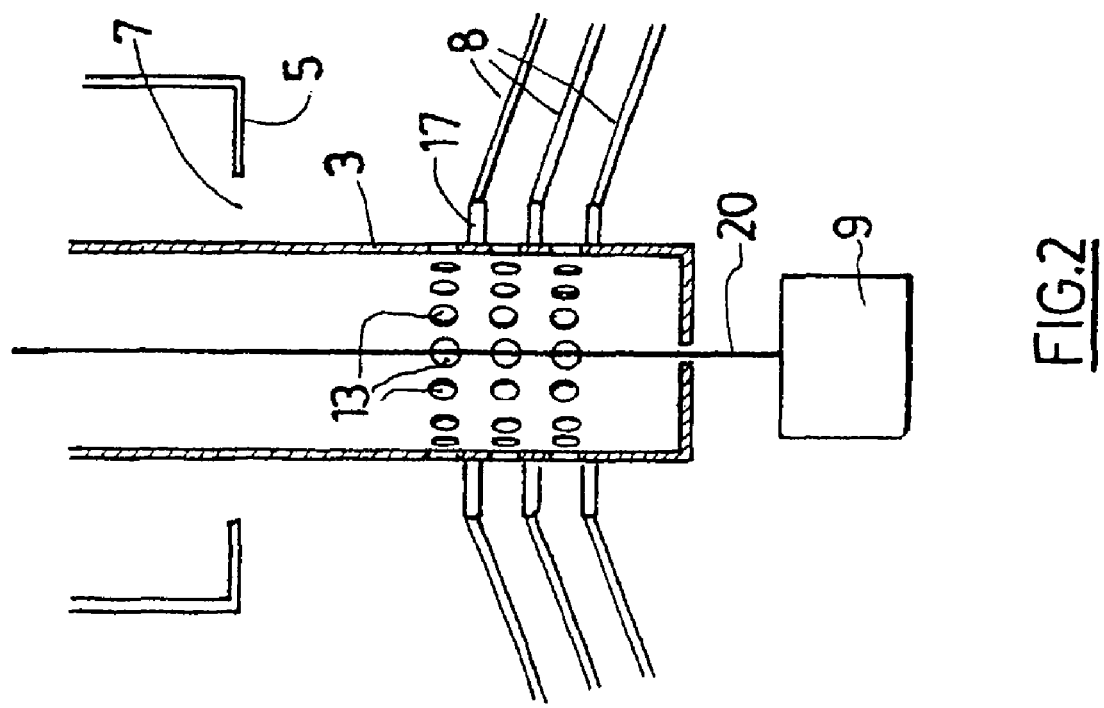

DEVICE AND METHOD FOR LOADING A CHAMBER WITH A DIVIDED SOLID

The invention relates to a device and a method for loading a chamber with a divided solid, particularly for loading a chemical reactor with a catalyst, and serving in particular, thanks to the hollow configuration of a rotating shaft, for the introduction and/or withdrawal of a functional device in the chamber during loading.

The invention relates more particularly to the loading of chemical or electrochemical, petroleum or petrochemical fixed bed reactors, with solid particles in the divided state, which may have the form of beads, grains, cylinders, pellets, rods, or any other shape, but which generally have relatively small dimensions. The particles may in particular be molecular sieves or solid catalyst grains, generally extruded, prepared either in irregular shape, or in the form of single- or multilobe rods, whereof the dimensions vary according to each individual case, from a few tenths of millimeters to a few centimeters.

This is the application to which reference is made more particularly in the rest of the specification, but the inventive device and method apply to the loading of a chamber with any other type of solid particles.

A number of methods and devices are known for increasing the density of a fixed bed of catalyst particles in a chemical reactor. These methods have the common feature of the introduction of the particles to be loaded via the top of the reactor and the collision of the individual particles during their fall with fixed or mobile mechanical deflectors, causing a random deviation of the particles. Ideally, the particles thus deviated from their vertical falling path fall individually and freely by a shower effect on the overall surface of the filling front where they form a dense and uniform deposit.

The Applicant, as part of its efforts to optimize these reactor loading systems, has developed an improved feeding device which, thanks to a particular dispersal system with flexible deflectors hinged on a rotating shaft, has succeeded in considerably reducing the steric hindrance of the system of deflectors and facilitating its installation in the reactors. This basic system is described in patent application EP 0 007 854 and the improvements to this filling device are disclosed for example in applications EP 0 116 246 and EP 0 769 462.

Despite the use of efficient deflector systems, the real behavior of the catalyst particles during the filling of the reactor may be different from the ideal behavior described above. The "filling front", also called the "loading profile", that is, the interface between the catalyst bed and the still unfilled part of the reactor, may sometimes deviate substantially from the horizontal. The catalyst particles, particularly when they have an anisotropic shape, then take position in preferential directions, thereby creating preferential paths for the liquid feed and the reagent gas through the catalyst bed, giving rise to unsatisfactory reactor operation for the operator.

The Applicant has currently succeeded in guaranteeing to its clients filling front slopes not exceeding 10%, but it continues to try to reduce this value in order to ensure optimal operation of the reactors filled with the dense loading device.

It is consequently important to be able to check the horizontality of the filling front during the loading, continuously or at certain intervals, in order, if necessary, to modify the operating parameters of the loading device to correct any drift of the slope of this filling front.

One solution currently consists in interrupting the loading to check the horizontality of the filling front by appropriate means, with regard to the quality criteria of the company responsible for the loading and also those of the operator. While this verification serves to correct the operating parameters of the filling device, particularly the speed of rotation of the particle dispersal system, the interruption of the loading operation that it entails is penalizing for the operator because it increases the reactor down time. Moreover, this solution is relatively complex because it requires the dismantling of the filling device for the installation of an appropriate measuring system.

Other solutions have been proposed in the prior art, for example, Japanese patent application JP 7-242337, which discloses a method and a device for monitoring the filling of a chamber (reactor) with a granular catalyst. The device described in this application comprises filling means, located in the upper central part of the chamber, spreading a shower of catalyst grains, and a device emitting a laser beam sweeping the surface of the filling front and means detecting the laser beam emitted by the emitting device and reflected by the surface of the loading front. The emitting and detecting devices are fixed to the chamber wall, at the level of the filling means. The system described in this application has the drawback of being rather difficult and time-consuming to install on the chamber to be filled, thereby undesirably lengthening the down time of the reactor. Furthermore, this system, comprising telemetry measurement means at the height of the filling means, cannot operate with the dense loading device described in EP 0 769 462, because the presence of the rotating deflectors between the filling front and the telemetry measuring system would disturb the laser telemetry measurements.

The Applicant has recently developed a system which, while essentially operating according to the same principle as the dense loading system (Densicat®) disclosed in EP 0 769 462, with the same ease of installation and operation, serves, among other possibilities, to introduce a device for measuring the progress and quality of filling and, in particular, the slope of the filling front. According to the present invention, the introduction of a measuring instrument is made feasible by supplanting the solid rotating shaft of the prior art by a hollow shaft having appropriate internal dimensions, that is, dimensions permitting either the passage of means for suspending said instrument, or the passage of said instrument itself after installation of the loading device on the reactor, or also permitting the performance of a precise operation in the zone to be loaded, or even a combination thereof.

The subject of the present invention is therefore a device for uniformly loading solid particles in a chamber comprising, in its upper part, particle feed means and, at its base located in the chamber to be loaded, a dispersal system integral with a central shaft rotated about a substantially vertical axis by drive means, and a feed line at least partially surrounding said central shaft, this device being characterized in that the central shaft is a tube having a sufficient inside diameter for carrying out, in the zone to be loaded, via this tube and during the loading period, a number of operations ancillary or complementary to said loading operation.

A further subject of the present invention is a method for loading a chamber with solid particles, from the top downward over the whole cross section of said chamber, using such a device.

A final object of the invention is the use of such a device for loading petroleum, chemical or petrochemical reactors.

In the loading device of the present invention, the catalyst particles issuing from the feed means fall by gravity into the feed line, between the inside wall of said feed line and the outer wall of the rotating central shaft. The feed line comprises, at its base, at least one discharge opening, located above the dispersal system, through which the particles fall on the dispersal system rotated by the central shaft.

The motor which rotates the tubular central shaft of the inventive device is preferably off-centered to said shaft and may be supplied with any compressed gas, for example air or nitrogen. The rotary motion can be transmitted from the drive means to the tubular shaft by any appropriate known means, for example by a belt, a chain or a set of gears, or a combination thereof.

As stated above, the inside dimensions of the central shaft must be sufficient for carrying out, in the zone to be loaded, and during the loading period, a number of operations ancillary or complementary to said loading operation.

Such operations may or may not involve the passage of a functional device. When the passage of a functional device is unnecessary for the operation to be performed, that is, for example, for a simple suction of dust through the rotating tube, or when a functional device is suspended, before the activation of the rotating system, from suspension means passing through the opening of said tube, the diameter of this tube may be relatively small. In contrast, to introduce and/or withdraw a functional device through the opening defined by the hollow shaft, the inside diameter thereof is generally larger and must in any case be sufficient for the passage of said functional device.

In concrete terms, the tube forming the central shaft of the inventive device preferably has an inside diameter larger than 2 cm, and more particularly larger than 10 cm.

Upon the introduction of the functional device during loading, via the opening in the central shaft, this functional device is liable to strike the rotating tube and be damaged. Furthermore, the operator who guides the functional device through the vertical channel of the shaft runs the risk of touching the rotating tube and being injured. To remedy this dual drawback, an additional fixed tube has been provided, isolating the rotating tube from the functional device and from the operator. In consequence, the loading device of the invention preferably further comprises a fixed protective tube having a smaller outside diameter than the inside diameter of the rotating tube. This fixed protective tube is placed inside the opening of the rotating tube so that the two tubes are substantially coaxial. This fixed tube is integral with the feed line. The fixed tube can be joined to the feed line, for example at their upper end.

The replacement of a solid shaft by a hollow shaft with a relatively large inside diameter is liable to create a central shadow in the central zone of the loading front, located immediately below the opening of the shaft or of the fixed tube, resulting in a hollow on the filling front due to insufficient input of particles. To make up for this possible shortage of particles and to avoid the formation of a hollow in the central zone of the chamber, the applicant has developed a device for aiming particles toward the center of the loading front. This device is a central deflector fixed to the bottom end of the fixed tube or of the rotating tube and located below the dispersal system. It has been designed to permit for distributing a controlled quantity of particles into the zone located immediately under the opening of the rotating tube.

It is in principle possible to use any type of deflector capable of diverting the particles toward the center of the chamber. In a preferred embodiment of the inventive device, this deflector has the shape of a funnel, preferably an openwork funnel, that is, a funnel comprising a number of openings that are sufficiently large to allow the passage of the particles to be loaded. These openings may be provided with a mechanism for adjusting their size, for example adjustable flaps, which may be remote-controlled, particularly from outside the reactor. This allows very fine adjustment of the distribution of the particles collected by the deflector in the central zone of the loading front.

In a particularly preferred embodiment of the inventive device, the funnel forming the central deflector integral with the bottom end of the fixed tube is supplied by a second funnel, referred to below as the "central deflector feed funnel".

This central deflector feed funnel takes up a limited stream of solid particles from the base of the feed line and sends this particle stream directly toward the central deflector by short-circuiting the dispersal system. The central deflector feed funnel is integral with the rotating tube. It traverses the particle dispersal system and terminates above the central deflector. Obviously, the bottom part of said feed funnel must have a sufficient diameter for the free flow of the solid particles toward the central deflector.

The central deflector feed funnel receives particles from at least one orifice provided in the base of the feed line. These orifice(s) is/are located above the circular trajectory formed by the upper end of the feed funnel, integral with the rotating tube. The base of the feed line preferably comprises several orifices located equidistant from one another, above the trajectory of the central deflector feed funnel.

As explained in the introduction, the inventive device preferably comprises a functional device suspended below the bottom end of the rotating tube, of the fixed tube or of the central deflector. This functional device is held by suspension means, for example a wire, a rod, a tube, a cable or a chain, passing through the opening of the rotating tube or of the fixed tube. It may be controlled by external control means and serves to perform operations ancillary or complementary to the loading operation.

Although the problem which led to the present invention was the difficulty of introducing an instrument into the chamber to be filled, in order to monitor the filling quality, the channel defined by the hollow shaft can obviously serve for the passage of a wide variety of functional devices serving for very different purposes.

In a preferred embodiment of the invention, the functional device introduced via the opening in the hollow shaft is a telemetry device operating with mechanical waves (for example, a sonar or an ultrasonic telemeter) or with electromagnetic waves (for example, a laser telemeter). The data gathered by such a telemetry device are preferably transmitted immediately, recorded and processed by an appropriate data processing system and may serve, if necessary, to modify the operating parameters of the dense loading device of the invention, in order to correct an insufficient horizontality of the loading front.

Such a telemetry device can also be replaced by a camera or a photographic apparatus, preferably digital, for visually evaluating the loading quality. The use of a photographic apparatus or camera generally implies the introduction of a lighting source which is preferably fixed to the photographic apparatus or camera but may be introduced separately.

During the loading of the chamber, it may also be advantageous to monitor physical or physicochemical parameters other than the horizontality of the loading front, such as the temperature, relative humidity, quantity of fine dust in suspension in the air, oxygen or chlorine content in the chamber, etc. Appropriate sensors for measuring these parameters are known in the prior art and can be selected and adapted by a person skilled in the art to the particular conditions of use of the device of the present invention.

In one alternative of the device of the present invention, the functional device introduced via the opening in the hollow shaft does not serve for measuring the physicochemical parameters in the chamber, but for introducing or withdrawing material. For example, one possibility is a sampling device for taking samples of divided solid or dust in suspension in the air above the deposit, or a suction device for continuously sucking out this fine dust. Finally, the hollow shaft of the device of the present invention could serve for introducing a second divided solid and a device for uniformly distributing or dispersing said second divided solid. Such an introduction and dispersal device is described in greater detail below with reference to the drawings appended hereto.

It goes without saying that the various functional devices can be introduced simultaneously or successively, or that a device may combine several functions.

In another embodiment of the loading device of the present invention, a functional device can be fixed, not via suspension means passing through the opening of the hollow tube, but directly to the fixed tube, at the end thereof, projecting beyond the rotating tube.

The hollow shaft of the loading device of the invention could also allow the passage of means for controlling a large functional device installed prior to the loading below the dispersal system.

As mentioned above, the hollow shaft of the dense loading device of the present invention allows the passage of a suction device for continuously, or at regular intervals, sucking out the dust or fines, in suspension in the air above the deposit of divided solids. In the context of the filling of reactors with catalysts, the existence of these fines in the catalyst or their formation by attrition during the chamber filling operation, raises a problem of fouling of the effluent treatment and separation systems, located downstream of the reactor. It is therefore advisable to remove these fines before starting up the reactor. The solution mentioned above, whereby a suction device is introduced via the channel of the hollow shaft into the zone located below the rotating deflectors, is not ideal in this case because of the risk of disturbing the air flow in this zone and modifying the trajectory of fall of the catalyst particles, with the consequence of a nonuniform deposit.

The Applicant has found means for effectively sucking out the catalyst fines by exploiting the hollow feature of the rotating shaft and of the fixed tube, without necessarily disturbing the air flow in the zone below the deflectors. This suction can be obtained thanks to a system for sucking out the dust via the rotating tube or via the fixed tube. The walls of the rotating tube and of the fixed tube, optionally present, comprise one or more suction openings for this purpose, preferably located in the zone of the onset of the free fall of the solid particles issuing from the orifice of the feed line and/or in the zone of formation of the dust fines due to impact against the surface of the rotating deflectors, in other words, in the zone of the dispersal system.

The loading device of the present invention can operate with any type of dispersal system designed to deviate in a perfectly random manner the solid particles issuing from the discharge opening in the base of the feed line, and making them fall individually in a shower of particles ("shower" dispersal system).

In a preferred embodiment, the distribution system comprises deflecting elements integral with the central shaft. These deflectors are generally made from a semirigid material, preferably rubber, and are capable of diverging angularly from the central shaft under the effect of the centrifugal force when said central shaft is rotating. Such a set of deflectors is described for example in application EP 0 769 462. The deflectors are preferably arranged in several levels and the same number of deflector elements is provided at each level, having substantially identical shapes, arranged vertically above one another.

The dispersal system may also be a dispersal head consisting of a series of substantially horizontal plates, parallel to one another and coaxial, arranged above one another and whereof the area swept during the rotation decreases from the top plate to the bottom plate, each plate, with the exception of the bottom plate, comprising a substantially circular opening at its center for the flow of at least part of the solid particles, by gravity, toward the plate located immediately below. Such a dispersal system is described in detail in application FR 2 721 900 and is used under the trade name CATAPAC by Petroval.

Another feasible embodiment for the dispersal system capable of operating with the loading device of the invention is the one described in international application WO 00/43304. This dispersal system comprises two lines, each having a particle flow opening, one opposite the other and curved about the same axis perpendicular to the axis of rotation of said dispersal system, so that their flow openings are each located on one side of the axis of rotation of said dispersal system, substantially in the same diametral plane. Each of these lines further comprises at least one longitudinal partition extending over all or a large part of its length, this partition being capable of dividing the particle stream and of spreading the flow thereof, against the centrifugal force, over all or a large part of the flow opening.

A method for loading a chamber with a catalyst according to the invention using a device as described above generally comprises the adjustment of the speed of rotation of the central shaft according to the diameter of the chamber to be loaded, the continuous introduction, via the feed means, of the solid particles into the feed line of the device, and the carrying out of an operation complementary or ancillary to the loading operation through the opening of the rotating tube or of the fixed tube.

The loading method of the invention using the device described in detail below preferably comprises the following steps:
  during the loading of the chamber, at least one record is made of the profile of the loading front of the catalyst bed using a functional measuring device, introduced via the opening of the rotating tube or of the fixed tube,
  the deviations of the loading profile from an ideal substantially horizontal profile are determined quantitatively by mathematical processing of said record,
  and, according to the result thus obtained, electrical signals are sent to order the adjustment of certain functional parameters of the loading device.

The functional parameters of the loading device which can be adjusted according to the filling profile recorded are, for example, the speed of rotation of the central shaft, the opening of the discharge opening(s) placed at the base of the feed line and the orientation of the dispersal system with regard to the vertical axis of the chamber.

The speed of rotation of the central shaft is comprised within the range generally used for known devices, and preferably between 25 and 250 revolutions per minute, and particularly between 40 and 150 revolutions per minute.

Figure 3:
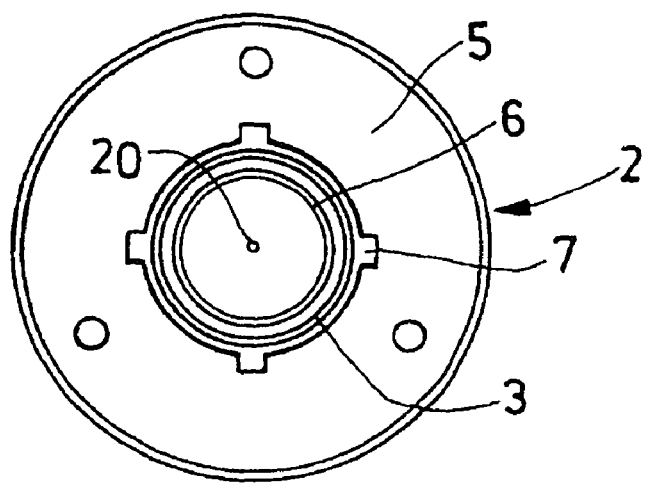
Figure 4:
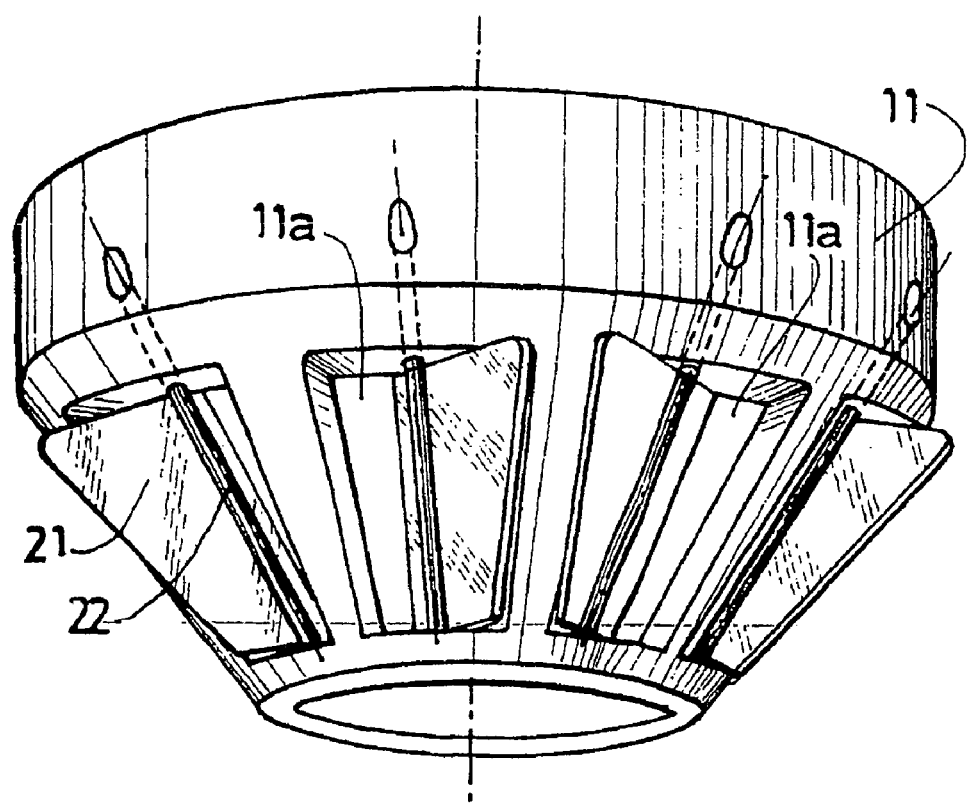

The invention is now described with reference to the drawings appended hereto, which are nonlimiting, in which:

FIG. 1 shows an axial cross section of a hollow shaft filling device according to the invention, FIG. 2 shows an axial cross section of the bottom zone of one embodiment of the hollow shaft, FIG. 3 shows a cross section along A-A of FIG. 1, FIG. 4 shows an enlarged perspective view of a central deflector, and FIG. 5 shows an axial cross section of the bottom zone of the hollow shaft illustrating one embodiment of the functional device introduced via the opening in the hollow shaft.

Figure 6A:
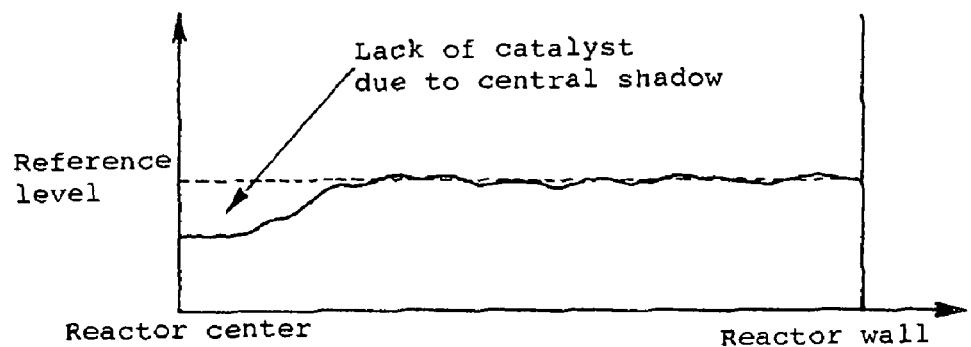
Figure 6B:
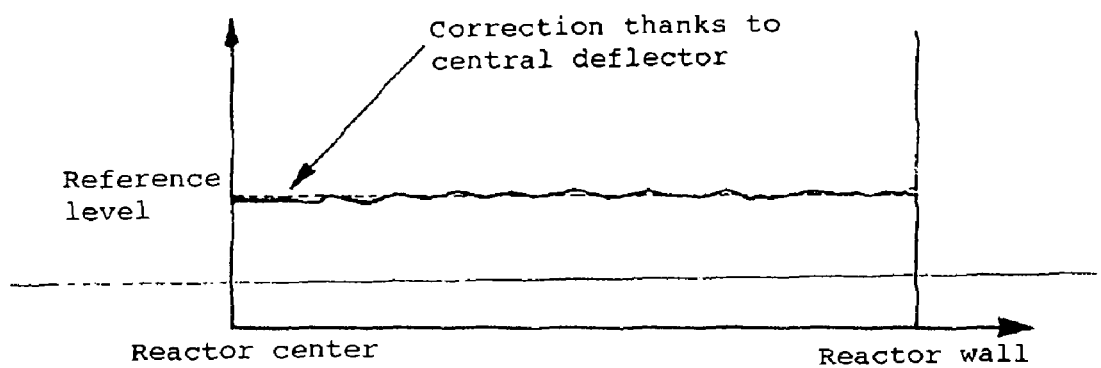

FIGS. 6a and 6b show profiles of the loading front, recorded by a sonar type of telemetry device, obtained with a device according to the invention respectively without and with a central deflector as shown in FIG. 4.

The filling device in FIG. 1 comprises a hopper 1 containing the divided solid. This hopper 1 is fixed to the feed line 2 of the device. During the filling process, the hopper 1 and the feed line 2 are filled with the divided solid which issues from the feed line 2 via openings 7 provided in the side wall and/or in the base 5 of this feed line. These openings 7 are preferably adjustable, using adjustable closure means (not shown), such as a variable opening diaphragm, for adjusting the flow of divided solid entering the chamber.

The feed line 2 is axially traversed, along its whole length, by a hollow shaft 3, securely held by at least two bearings, and rotated by drive means 4, preferably a compressed air motor, placed on the feed line side. The transmission between the motor 4 and the drive shaft 3 takes place by any appropriate means, for example by a belt. The overall filling device is securely held and fixed in the manhole of the reactor by support tubes 16. In the zone below the bottom end of the discharge line 2, rubber deflectors 8 are fixed to the outer wall of the hollow shaft via deflector-holding elements 17.

During the filling of a reactor using the device in FIG. 1, the divided solid introduced into the hopper 1 falls via the feed line 2 to the adjustable openings 7, from which it falls on the rotating hinged deflectors 8.

According to the present invention, after installation of the filling device, before, during or after the filling process, it is possible to introduce a functional device 9 into the chamber, having sufficiently small dimensions for its passage via the opening in the hollow shaft. The functional device is suspended from appropriate suspension means 20 which may, for example, be a wire, a rod, a tube, a cable or a chain.

FIG. 1 shows a preferred embodiment of the loading device of the invention in which a fixed tube 6 duplicates the hollow shaft 3 inside it and along the whole length thereof, in order to completely isolate the operator loading the particles into the hopper 1 or introducing a functional device 9 through the opening in the central shaft. The fixed tube is integral with the feed line 2 to which it is fixed by its upper end. In the embodiment shown in FIG. 1, the fixed tube 6 is longer than the rotating tube 3 and projects beyond it for a short length. At the end of the fixed tube 6, below the dispersal system 8, a central deflector 11 is fixed, roughly having the shape of a funnel. This funnel 11 comprises a series of openings 11a sufficiently large to allow the passage of the particles to be loaded. The central deflector collects, on the one hand, a certain fraction of the particles dispersed by the dispersal system and, on the other, particles issuing directly, via a funnel 10, from the feed line without having been dispersed by the dispersal system 8. The funnel 10 thereby serves to short-circuit said dispersal system. The feed funnel 10 of the central deflector 11 is fixed to the hollow shaft 3 and is rotated with the dispersal deflectors 8. The funnel 10 collects the solid particles issuing via at least one opening 19 provided in the base 5 of the feed line. In this FIG. 1, the opening(s) (19) supplying the funnel 10 is/are different from the openings 7 through which issue the particles dispersed by the dispersal system 8. The two types of openings 7 and 19 in fact form two concentric circles. However, a single series of openings is equally feasible, forming, in the base 5 of the feed line, a single circle about the central axis of the loading device.

FIG. 2 shows an enlarged view of the fastening zone of three series of deflectors 8 to the outer wall of the hollow shaft 3. The functional device 9 introduced via the opening in the hollow shaft 3, suspended from the suspension means 20, is located in the zone below the bottom end of the hollow shaft 3. For the sake of clarity, only the deflectors located in the plane of the sheet are shown, but it must be understood that each series of deflectors 8 consists of a plurality of deflectors fastened along a horizontal line all around the hollow shaft. Immediately above each of these horizontal fastening lines, a series of suction openings 13 is provided. These suction openings 13, thanks to suction means (not shown) located in the hollow shaft or at the upper end thereof, can be used to suck out the dust fines in suspension in the air in the immediate vicinity of this zone of the hollow shaft. The position of these suction openings 13 has been selected so that these orifices are located close to the zone of fall of the divided solid from the opening 7 and close to the zone of formation of the dust fines due to the impact with the deflectors 8.

FIG. 3 shows a cross section along A-A in FIG. 1. In this figure, the innermost circle represents the fixed tube 6, the second circle corresponds to the rotating tube 3 and the outermost circle to the outer wall of the feed line 2. In the base 5 of the feed line, two types of openings are arranged: a first series of four openings 7 forming a circle very close to the rotating tube 3, and a second series of three openings 19 forming an intermediate circle, closer to the outer wall of the feed line 2. The particles issuing through the openings 7 are dispersed by the dispersal system 8. The particles issuing through the openings 19 are either collected by the feed funnel 10 of the central deflector 11 when this passes below one of these openings 19, or dispersed by the dispersal system when the funnel 10 is not positioned below one of these openings 19.

FIG. 4 shows a perspective view from below of a central deflector 11. This deflector has a funnel shape with a vertical part and an inverse cone shaped part. In this inverse cone shaped part are arranged openings 11a of which only four are shown in this figure. At least part of these openings 11a are provided with flaps 21 adjustable by rotation about an axis 22.

FIG. 5 shows an embodiment of the filling device of the present invention in which the functional device 9 is not a measuring device such as an ultrasonic or laser type telemetry probe, but a device for distributing a second divided solid. The bottom part of the hollow shaft 3 with the three series of deflectors 8 is identical to that shown in FIG. 1. The functional device 9 consists of a second shaft 14 placed substantially along the axis of the hollow shaft 5 and, downstream of the outlet orifice 15 of said hollow shaft, of at least one deflector element 12 hinged to said second shaft 14 so as to deviate therefrom angularly due to the centrifugal force when the shaft is rotated by a motor (not shown), independent of the motor 4 driving the hollow shaft 3. A person skilled in the art will understand that the functional device shown in this figure substantially corresponds to the device for distributing a divided solid according to the prior art, disclosed for the first time in application EP 0 007 854, with the difference that it must have dimensions allowing its passage through the channel formed by the hollow shaft. The use of such a divided solid distribution device as a functional device serves to introduce and uniformly distribute a second divided solid, different from the one dispersed via the openings 7 of the feed line 2. This second divided solid is introduced via the channel of the hollow shaft 3 which terminates in the outlet orifice 15 and its flow rate can be adjusted by a variable opening diaphragm 15a provided at the bottom end of the hollow shaft 3.

EXAMPLE

Demonstration of the Effectiveness of the Central Deflector

A chamber having a diameter of about 3 meters was loaded using a device according to the present invention, comprising, as a dispersal system, rubber strips arranged in three series of distinct heights at the end of the rotating tube. The rotating tube was hollow and had an inside diameter of 14 cm. It was duplicated by a fixed tube having an inside diameter of 13 cm. This fixed tube projected beyond the rotating tube by about 5 cm. Fixed to the end of the fixed tube was a Puls68 model sonar detector sold by VEGA, of which the detection head can pivot through an angle of 360° in order to take measurements over the entire filling front. The sonar detector was remote-controlled via cable, by a data processing system. This system allows the recording, in a very short time, about 30 seconds, of the profile of the loading front, at any time during the filling operation.

A first loading operation was first carried out with such a device rotating at a speed of about 70 revolutions per minute, in the absence of a central deflector. FIG. 6a shows the profile of the filling front thereby obtained. It shows clearly that at the center of the chamber, under the central shadow, in the prolongation of the hollow shaft, a hollow is formed due to an insufficient input of particles.

The loading operation was repeated under identical conditions with the difference that an openwork frustoconical deflector was fixed to the end of the fixed tube, as shown in FIG. 4. It was found (FIG. 6b) that the real profile of the loading front was substantially identical to the ideal profile, plane and horizontal (reference level).

The invention claimed is:

1. A device for uniformly loading solid particles in a chamber comprising, in its upper part, particle feed means and, at its base located in the chamber to be loaded, a dispersal system integral with a central shaft rotated about a substantially vertical axis by drive means, and a feed line at least partially surrounding said central shaft, this device being characterized in that the central shaft is a tube having a sufficient inside diameter for carrying out, in the zone to be loaded, via this tube and during the loading period, a number of operations ancillary or complementary to said loading operation, wherein the tube forming the central shaft has an inside diameter larger than 2 cm, and in that a fixed tube, integral with the feed line is placed inside the rotating tube, the fixed tube and rotating tube being substantially coaxial.

2. The device as claimed in claim 1, wherein the particles issuing from the feed means flow in the feed line, in downflow, between the inside wall of said feed line and the outer wall of said rotating tube, said feed line comprising at its base at least one particle discharge opening, located above the dispersal system.

3. The device as claimed in either of claim 1, wherein the drive means is off-centered about the rotating central shaft.

4. The device as claimed in claim 3, characterized in that the drive means is fed with a compressed 35 gas, preferably air or nitrogen.

5. The device as claimed in claim 1, wherein the tube forming the central shaft has an inside diameter larger than 10 cm.

6. The device as claimed in claim 1, further comprising at least one central deflector, fixed to the bottom end of the fixed tube and located below the dispersal system, designed for distributing a controlled quantity of particles in the zone located immediately below the opening of the rotating tube.

7. The device as claimed in claim 6, wherein the central deflector has the shape of a funnel.

8. The device as claimed in claim 6, further comprising a funnel for feeding the central deflector, integral with the rotating tube, passing through the dispersal system and terminating above the central deflector, the lower part of said feed funnel having a sufficient diameter for the free flow of the solid particles toward the central deflector.

9. The device as claimed in claim 6, wherein the central deflector has the shape of an openwork funnel.

10. The device as claimed in claim 1, further comprising a system for sucking out dust via the rotating tube and/or the fixed tube.

11. The device as claimed in claim 10, wherein the walls of the rotating tube and of the fixed tube comprise one or more suction openings located in the zone of the dispersal system.

12. The device as claimed in claim 1, further comprising a functional device suspended below the bottom end of the rotating tube, of the fixed tube or of the central deflector, via suspension means passing through the opening of the rotating tube or of the fixed tube, and controlled by external control means, said functional device serving to carry out operations ancillary or complementary to the loading operation; wherein the functional device is selected from the group consisting of a telemetry device, a lighting device, a photographic apparatus, a camera, a sensor, an analysis or monitoring device, a sampling device, a suction device, a device for introducing a controlled quantity of another divided solid, and a device for distributing a divided solid.

13. The device as claimed in claim 12, wherein the telemetry device is selected from the group consisting of a laser telemeter, an ultrasonic telemeter and a sonar telemeter.

14. The device as claimed in claim 12, wherein the suspension means is a wire, a rod, a tube, a cable or a chain.

15. The device as claimed in claim 1, characterized in that the dispersal system is designed to randomly deflect the solid particles issuing from the discharge opening, and to make them fall individually in a shower of particles.

16. The device as claimed in claim 1, characterized in that the distribution system comprises deflecting elements integral with the central shaft, made from a semirigid material, preferably rubber, capable of diverging angularly therefrom under the effect of the centrifugal force when said central shaft is rotating.

* * * * *